US009176529B2

(12) United States Patent
Hata

(10) Patent No.: US 9,176,529 B2
(45) Date of Patent: Nov. 3, 2015

(54) ELECTRONIC DEVICE

(71) Applicant: Kabushiki Kaisha Toshiba, Tokyo (JP)

(72) Inventor: Yukihiko Hata, Hamura (JP)

(73) Assignee: Kabushiki Kaisha Toshiba, Tokyo (JP)

(*) Notice: Subject to any disclaimer, the term of this patent is extended or adjusted under 35 U.S.C. 154(b) by 352 days.

(21) Appl. No.: 13/904,229

(22) Filed: May 29, 2013

(65) Prior Publication Data
US 2014/0118931 A1 May 1, 2014

(30) Foreign Application Priority Data

Oct. 29, 2012 (JP) .................................. 2012-238244

(51) Int. Cl.
*H01G 7/00* (2006.01)
*H01G 7/06* (2006.01)
*H01G 7/04* (2006.01)
*H05K 5/00* (2006.01)
*H05K 7/00* (2006.01)
*A61F 7/00* (2006.01)
*G05B 9/02* (2006.01)
*G06F 1/16* (2006.01)
(Continued)

(52) U.S. Cl.
CPC .............. *G06F 1/1626* (2013.01); *G06F 1/163* (2013.01); *G06F 1/206* (2013.01)

(58) Field of Classification Search
CPC ............ G06F 1/163; G06F 1/206; G05F 5/00
USPC ............ 700/79, 299, 300; 361/280, 281, 282, 361/679.03; 607/96, 108
See application file for complete search history.

(56) References Cited

U.S. PATENT DOCUMENTS 4,509,531 A * 4/1985 Ward ............................ 600/549
6,149,674 A * 11/2000 Borders ......................... 607/96
6,301,593 B1 10/2001 Toyosato
(Continued)

FOREIGN PATENT DOCUMENTS

JP 2000-112709 4/2000
JP 2000-251544 9/2000
(Continued)

OTHER PUBLICATIONS

MIT Wristband Could Make AC Obsolete; by Kyle Vanhemert; published on Oct. 30, 2013; printed from Internet on Jul. 9, 2015; 11 pages.*

(Continued)

*Primary Examiner* — Ronald Hartman, Jr.
(74) *Attorney, Agent, or Firm* — Rutan & Tucker LLP; William W. Schaal

(57) ABSTRACT

According to one embodiment, an electronic device includes: a casing comprising a display thereto, the casing being configured to house therein an electric component configured to generate heat; a wearing member configured to be wrapped around an arm of a human body to cause the casing to be worn on the arm; a plurality of electrodes configured to face, in a state that the casing is worn on an arm, a side of the arm; an impedance measurement module configured to measure impedance between two of the electrodes; and a controller configured to control the electric component so that when the impedance obtained in the impedance measurement module is lower than a threshold, an amount of the heat generated by the electric component becomes small compared with a case that the impedance is higher than the threshold.

10 Claims, 6 Drawing Sheets

(51) Int. Cl.
*G05D 23/00* (2006.01)
*G06F 1/20* (2006.01)

(56) References Cited

U.S. PATENT DOCUMENTS

| | | | |
|---|---|---|---|
| 6,452,093 | B1 | 9/2002 | Ishii et al. |
| 6,532,482 | B1 | 3/2003 | Toyosato |
| 6,542,359 | B2 * | 4/2003 | Babcock et al. ......... 361/679.46 |
| 6,939,344 | B2 * | 9/2005 | Kreindel ........................... 606/9 |
| 8,541,745 | B2 * | 9/2013 | Dickinson et al. ............ 250/340 |
| 2001/0025289 | A1 | 9/2001 | Jenkins et al. |
| 2002/0040377 | A1 | 4/2002 | Newman et al. |
| 2002/0080577 | A1 * | 6/2002 | Babcock et al. ............. 361/687 |
| 2008/0039700 | A1 * | 2/2008 | Drinan et al. ................. 600/301 |
| 2008/0287747 | A1 * | 11/2008 | Mestrovic et al. ............ 600/300 |
| 2009/0317699 | A1 * | 12/2009 | Gao et al. ........................ 429/62 |
| 2010/0100004 | A1 * | 4/2010 | van Someren ................. 600/549 |
| 2010/0198322 | A1 * | 8/2010 | Joseph et al. .................. 607/108 |
| 2013/0119255 | A1 * | 5/2013 | Dickinson et al. ............ 250/340 |
| 2014/0260331 | A1 * | 9/2014 | Lofy et al. ............. 62/3.3 |
| 2015/0076832 | A1 * | 3/2015 | Fortier et al. ................. 290/1 R |
| 2015/0099941 | A1 * | 4/2015 | Tran ............................... 600/300 |
| 2015/0101788 | A1 * | 4/2015 | Smith et al. ................... 165/201 |

FOREIGN PATENT DOCUMENTS

| | | |
|---|---|---|
| JP | 2004-199145 | 7/2004 |
| JP | 2008-086392 | 4/2008 |

OTHER PUBLICATIONS

Dhama Innovations; Information about Company from the corporate catalogue; printed from Internet on Jul. 9, 2015; 17 pages.*

* cited by examiner

ELECTRONIC DEVICE

CROSS-REFERENCE TO RELATED APPLICATIONS

This application is based upon and claims the benefit of priority from Japanese Patent Application No. 2012-238244, filed Oct. 29, 2012, the entire contents of which are incorporated herein by reference.

FIELD

Embodiments described herein relate generally to an electronic device.

BACKGROUND

Conventionally, there has been known an electronic device wearable on a human body.

In this kind of the electronic device, as one example, it is preferable that the electronic device be capable of suppressing a temperature rise while suppressing the degradation of performance thereof.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, an electronic device comprises: a casing comprising a display thereto, the casing being configured to house therein an electric component configured to generate heat; a wearing member configured to be wrapped around an arm of a human body to cause the casing to be worn on the arm; a plurality of electrodes configured to face, in a state that the casing is worn on an arm, a side of the arm; an impedance measurement module configured to measure impedance between two of the electrodes; and a controller configured to control the electric component so that when the impedance obtained in the impedance measurement module is lower than a threshold, an amount of the heat generated by the electric component becomes small compared with a case that the impedance is higher than the threshold.

A plurality of exemplary embodiments or modifications described below comprise similar parts. Therefore, hereinafter, the similar parts are given the same numerals and their repeated explanations are omitted. Furthermore, the parts comprised in the respective embodiments or modifications can be substituted by corresponding parts of the other embodiments or modifications.

Furthermore, in the following embodiments, a case that an electronic device is constituted as a tablet-type (slate-type) personal computer provided with a wearing member is exemplified. However, an electronic device according to the present embodiment is not limited to these examples. The electronic device in the present embodiment is, for example, a device wearable on (detachable from) a human body such as a video display (a portable player), a smart phone, a mobile phone, a personal digital assistant (PDA), a TV phone, an electronic book terminal, or a television receiver, provided with parts (electric parts, electronic parts, or the like) in the inside of a casing, and can be constituted as a device capable of performing display output, audio output, audio input, operation input, or the like.

Embodiment

Figure 1:
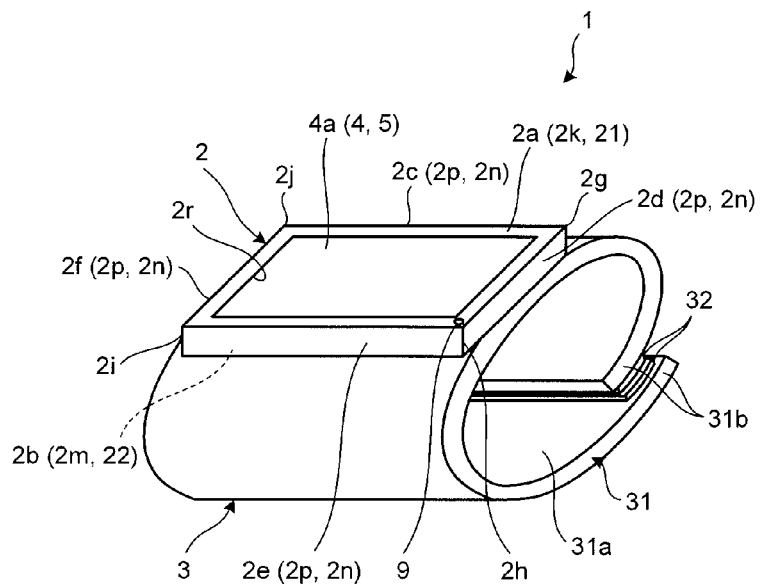
FIG. 1 is an exemplary perspective view of one example of an electronic device according to an embodiment.
Figure 2:
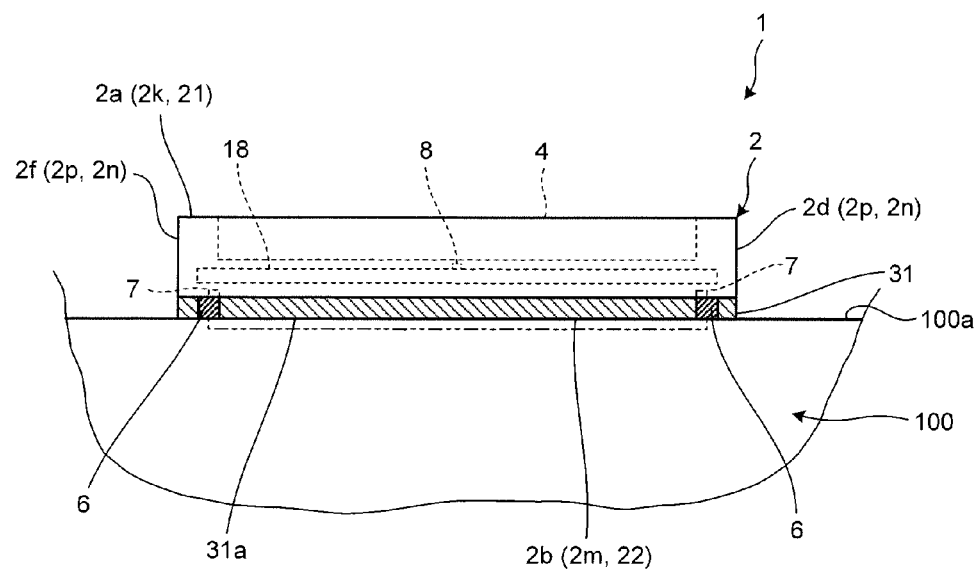
FIG. 2 is an exemplary explanatory view illustrating a state that one example of the electronic device in the embodiment is worn on an arm of a human body in a state that the arm is not covered with clothing.
Figure 3:
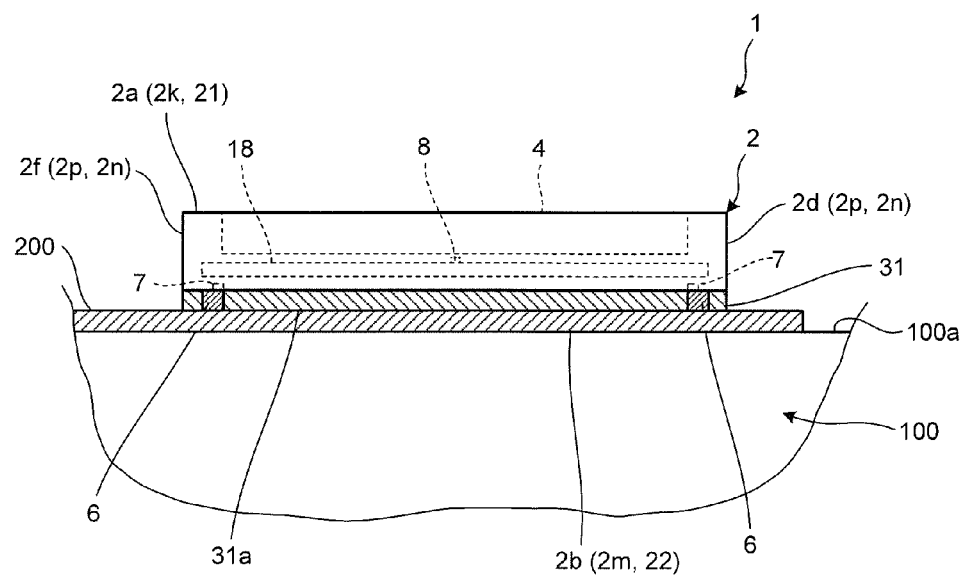
FIG. 3 is an exemplary explanatory view illustrating a state that one example of the electronic device in the embodiment is worn on an arm of a human body in a state that the arm is covered with clothing.

In an embodiment, as one example illustrated in FIGS. 1 to 3, an electronic device 1 comprises a casing 2 and a wearing member 3. The casing 2 houses at least a part of a display 4 (a display part, an electric part) therein. Furthermore, the casing 2 houses a board 18 (a circuit board, a printed circuit board, electric parts) therein. In addition, the casing 2 is provided with a light emitting part 9 (a light emitting diode (LED), a display part, or the like).

In the present embodiment, as one example illustrated in FIG. 1, the casing 2 has the external appearance of a quadrangular shape (a rectangular shape, as one example in the present embodiment) in a front view (as viewed from the normal direction or orthogonal direction) and in a rear view with respect to a display screen 4a of the display 4. The casing 2 is, as one example in the present embodiment, formed in a rectangular parallelepiped shape being thin flat in the anteroposterior direction (in the thickness direction of the casing 2). The casing 2 has a face 2a (a front, a front face, a surface portion), a face 2b (a rear face, a back face, a surface portion) opposite to the face 2a, and a face 2p (a side face, a surface portion) extending between the face 2a and the face 2b. Each of the face 2a and the face 2b intersects with the thickness direction of the casing 2. The face 2a and the face 2b are substantially in parallel to each other. Furthermore, the face 2a and the face 2b intersect with (are orthogonal to, as one example in the present embodiment) the face 2p. In addition, the casing 2 has four end portions 2c to 2f (side portions, edge portions, peripheral portions) and four corner portions 2g to 2j (projecting portions, curved portions, end portions) in a front view. Each of the end portions 2c and 2e is one example of a long side portion. Each of the end portions 2d and 2f is one example of a short side portion.

Furthermore, the casing 2 has a wall portion 2k (a part, a plate, a front wall portion, a front side wall portion, a top wall portion, a first wall portion), a wall portion 2m (a part, a plate, a rear wall portion, a back wall portion, a bottom wall portion, a second wall portion), and wall portions 2n (parts, plates, side wall portions, end wall portions, erected wall portions, extending portions, third wall portions). The wall portion 2k has the face 2a. The wall portion 2m has the face 2b. Each wall portion 2n has the face 2p. Each of the wall portions 2k, 2m, and 2n is formed in a quadrangular shape (a rectangular shape, as one example in the present embodiment). In addition, each of the wall portions 2k, 2m, and 2n is formed in a plate-like shape. The wall portion 2k is provided with a quadrangular opening 2r.

In addition, the casing 2 is constituted by combining a plurality of parts (divided bodies, members). The casing 2 has, as one example, a member 21 (a front side member, a cover, a bezel, a plate, a first member) and a member 22 (a back side member, a base, a bottom, a plate, a second member). The member 21 comprises the wall portion 2k. The member 22 comprises the wall portion 2m. The wall portion 2n is comprised in at least any one (the member 22, as one example in the present embodiment) of the member 21 and the member 22. The members 21 and 22 can be, for example, composed of a metallic material or a synthetic resin material. The metallic material can be, for example, made by casting, pressing, or cutting. The synthetic resin material can be, for example, made by injection molding. Here, the casing 2 can have members (not illustrated in the drawings) different from the members 21 and 22.

Furthermore, in the present embodiment, as one example, the casing 2 houses the display 4 (the display part, the display, the panel, the display component) therein. To be more specific, a user can view the display screen 4a of the display 4 from the front side of the display 4 through the opening 2r. The display 4 has the external appearance of a quadrangular shape (a rectangular shape, as one example in the present embodiment) in a front view. The display 4 is formed in a rectangular parallelepiped shape being thin flat in the anteroposterior direction thereof. The display 4 is, for example, a liquid crystal display (LCD), an organic electro-luminescent display (OELD), or the like. Here, the display 4 may be a flexible display.

Furthermore, in the present embodiment, as one example, the display 4 is provided with a transparent, relatively thin, and quadrangle-shaped input operation panel 5 (a touch panel, a touch sensor, an operation screen, an input operation part, an input reception part) on the front side (the surface side, the wall portion 2k side) thereof. The input operation panel 5 covers the display screen 4a. An operator (a user, for example) performs input processing by operations such as touching, pushing, or rubbing with a finger, a stylus, or the like with respect to the input operation panel 5, moving a finger, a stylus, or the like in the vicinity of the input operation panel 5, or the like. Light emitted from the display screen 4a of the display 4 passes through the input operation panel 5 toward the front side (the outside) of the casing 2 from the opening 2r of the wall portion 2k. The input operation panel 5 is one example of an input part. In addition, in the present embodiment, as one example, the display 4 and the input operation panel 5 are fixed to (supported on) the casing 2 by way of fixtures (fasteners such as screws, metal fittings, or parts, not illustrated in the drawings), adhesive parts (adhesive agents, double-stick tapes, or the like, not illustrated in the drawings). Here, the input operation panel 5 may be constituted as an in-cell type touch panel comprised in the display 4.

The wearing member 3 allows the wearing of the casing 2 (the electronic device 1) on a human body. In the present embodiment, as one example, the wearing member 3 is joined (fixed, connected) to the wall portion 2m of the casing 2. The wearing member 3 has a belt-shaped part 31 and a fastener part 32. In the present embodiment, the belt-shaped part 31 is, as one example, wrapped around a forearm of a human-body arm 100 (see FIGS. 2 and 3). The belt-shaped part 31 extends in a long belt shape (a rectangular shape, a strip shape) along the short side direction of the casing 2 (the direction along the end portion 2d or 2f, the lateral direction in FIGS. 2 and 3). In the present embodiment, as one example, the width of the belt-shaped part 31 is substantially equal to the width of the casing 2. The belt-shaped part 31 is provided with the fastener parts 32 on both end portions 31b in the longitudinal direction (in the depth direction on the paper on which FIGS. 2 and 3 are drawn) of the casing 2. In the present embodiment, as one example, the fastener parts 32 are hook-and-loop fasteners capable of being attached and detached to each other. The belt-shaped part 31 is wrapped around the forearm of the human-body arm 100 to fasten both fastener parts 32 thus wearing the wearing member 3 as well as the casing 2 (the electronic device 1) on the arm 100. Here, as one example, the casing 2 is used in a state that the casing 2 is arranged on the elbow side of a wrist and a side coplanar with the back of a hand in a posture such that the longitudinal side of the casing 2 is placed along the arm 100.

When clothing 200 (a covering, see FIG. 3) does not exist (is not interposed) between the arm 100 (the human body) and the casing 2 (the electronic device 1) as illustrated in FIG. 2, the heat of the casing 2 is easily transmitted to the arm 100 compared with a case that the clothing 200 exists (is interposed) between the arm 100 (the human body) and the casing 2 (the electronic device 1) as illustrated in FIG. 3. Accordingly, to consider a case where at least a part of the electronic device 1 is brought into direct contact with the arm 100 of a user without the clothing 200 interposed therebetween, when the electronic device 1 has higher temperature than the user with a certain level of temperature difference, the user may feel uncomfortable. In this case, the electrical operation of the electronic device 1 may be suppressed to reduce heat generation. However, when the control of suppressing the heat generation from the electronic device 1 is constantly performed, for example, the operation of the electronic device 1 becomes slow thus inconveniencing the user. Therefore, in the present embodiment, as one example, the electronic device 1 is provided with a plurality of electrodes 6 exposed to the arm 100 side thereof (a surface 100a of the arm 100), and the electrical operation of the electronic device 1 is controlled depending on the electrical characteristics of electric signals between two (at least two, at least a pair of) electrodes 6. That is, in the present embodiment, as one example, when the measured value of the electrical characteristics of the electric signals between the two electrodes 6 is a value corresponding to a state that the clothing 200 is not interposed, the electrical operation of the electronic device 1 is suppressed compared with the case that the measured value is a value corresponding to a state that the clothing 200 is interposed thus reducing the heat generation. That is, when the measured value of the electrical characteristics of the electric signals between the two electrodes 6 is a value corresponding to the state that the clothing 200 is interposed, the electrical operation of the electronic device 1 is not easily suppressed compared with the case that the measured value is a value corresponding to the state that the clothing 200 is not interposed.

In the present embodiment, as one example illustrated in FIGS. 2 and 3, the electrodes 6 are projected from the casing 2 through the belt-shaped part 31 and uncovered with surface 31a at the arm 100 side of the belt-shaped part 31. Therefore, the electrodes 6 face the arm 100 side when the electronic device 1 is worn on the arm 100. As illustrated in FIG. 2, when the belt-shaped part 31 (the wearing member 3) is wrapped around the arm 100 in a state that the clothing 200 does not exist, the electrodes 6 are brought into contact with the surface 100a (flesh, skin) of the arm 100. On the other hand, as illustrated in FIG. 3, when the belt-shaped part 31 is wrapped around the arm 100 in a state that the clothing 200 exists, the electrodes 6 are brought into contact with the clothing 200. As illustrated in FIG. 3, when at least one of the two electrodes 6 (both electrodes 6, in FIG. 3) is brought into contact with the clothing 200 (the covering), an electric current does not easily flow between these two electrodes 6. On the other hand, as illustrated in FIG. 2, when both of the two electrodes 6 are brought into contact with the arm 100, an electric current easily flows between these two electrodes 6 compared with the case that the clothing 200 is interposed.

Figure 4:
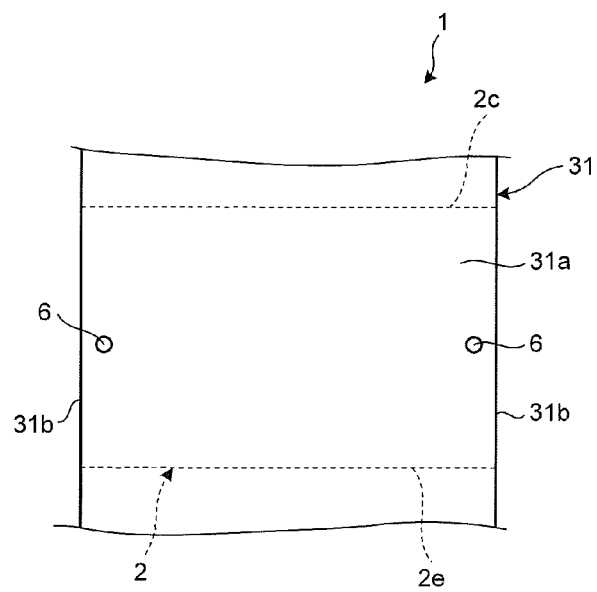
FIG. 4 is an exemplary plan view of one example of the electronic device as viewed from the contact surface side of the electronic device that is brought into contact with an arm of a human body.

In the present embodiment, as one example illustrated in FIG. 4, the belt-shaped part 31 is provided with two electrodes 6 aligned along the width direction of the belt-shaped part 31 in the area of the belt-shaped part 31 at the back side of the casing 2. The two electrodes 6 are aligned along the width direction of the belt-shaped part 31 thus being, as one example, aligned in the longitudinal direction of the arm 100. Therefore, as one example, both of the two electrodes 6 are easily brought into contact with the surface 100a of the arm 100 or the clothing 200 compared with the case that the electrodes 6 are not aligned along the longitudinal direction of the arm 100.

In the present embodiment, as one example illustrated in FIGS. 2 and 3, the electronic device 1 is provided with sensors 7 (temperature detectors) for detecting the temperatures of the electrodes 6. The electrodes 6 are brought into contact with the arm 100 (the human body) or the clothing 200 covering the arm 100 in a state that the electronic device 1 is worn on the arm 100 and hence, the temperature detected by the sensors 7 can be considered as the temperature of the arm 100 or the clothing 200 under such a predetermined condition that the electrodes 6 are not in the high temperature state. Furthermore, the electronic device 1 is provided with a sensor 8 (a second temperature detector) for detecting the temperature inside the casing 2. The sensor 8 can be placed in the vicinity of an electric component that generates heat (the display 4, a CPU, a package mounted on the board 18, or the like). The sensors 7 and 8 are, for example, thermistors, thermocouples, or temperature sensor ICs.

Figure 5:
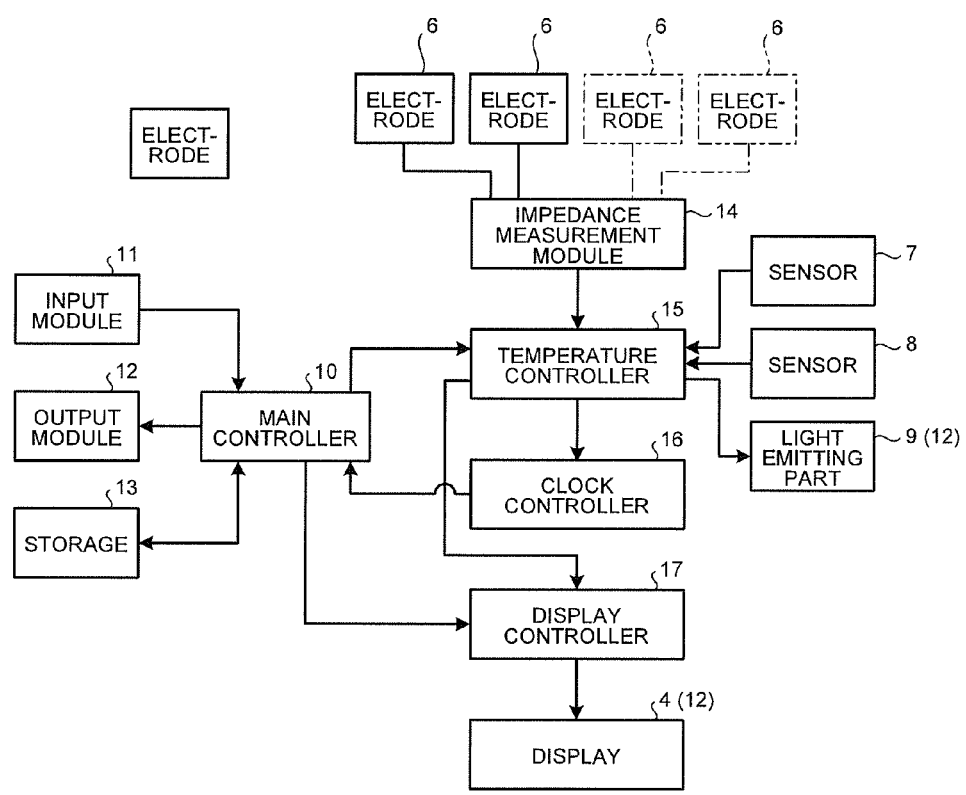
FIG. 5 is an exemplary block diagram of one example of the electronic device in the embodiment.

In the present embodiment, as one example illustrated in FIG. 5, the electronic device 1 is provided with a main controller 10, an input module 11, an output module 12, a storage 13, an impedance measurement module 14, a temperature controller 15 (a controller), a clock controller 16, a display controller 17, and the like. The main controller 10 is, for example, a central processing unit (CPU). The input module 11 is, for example, the input operation panel 5 or other component such as an operation button, a microphone, a keyboard, or a switch (not illustrated in the drawings). The output module 12 is, for example, the display 4, the light emitting part 9, or other component such as a speaker or a buzzer (not illustrated in the drawings). The storage 13 is, for example, a volatile, nonvolatile, non-rewritable, or rewritable memory or a storage device such as a random access memory (RAM), a read only memory (ROM), a hard disk drive (HDD), or a solid state drive (SSD). In the storage 13, a nonvolatile storage area also stores therein data (threshold data, tables, or the like) used for control (arithmetic processing) in the temperature controller 15. The impedance measurement module 14 (an electrical characteristic measurement module) feeds, for example, an extremely weak current (an alternating current) from two electrodes 6 to the arm 100 (the human body) to measure an impedance (electrical characteristics) between the electrodes 6. The impedance measurement module 14 can be constituted as an impedance measurement IC. The temperature controller 15 performs, for example, the control of suppressing the heat generation of (lowering the temperature of) various kinds of electrical components based on the results of the measured impedance (the electrical characteristics) by the impedance measurement module 14. The temperature controller 15 can be, for example, constituted as a temperature control IC and constituted as a part of the function of an embedded controller (EC) or a keyboard controller (KBC). Furthermore, the temperature controller 15 acquires a temperature (data) detected by the sensors 7 or 8 from a signal received from the sensors 7 or 8. The clock controller 16 lowers, for example, the clock frequency of the CPU in response to the instruction of the temperature controller 15 to perform the control of suppressing the heat generation (lowering the temperature) of the CPU. The display controller 17 controls the display 4 so that the predetermined images or videos are displayed on the display 4. In addition, the display controller 17 lowers, for example, brightness in the display 4 or reduces a time until the display screen 4a left unoperated becomes dark to perform the control of suppressing the heat generation (lowering the temperature) of the display 4. Here, the main controller 10 refers to a table of the value of impedance (electrical characteristics) and the characteristic value of the human body (a body fat percentage or the like) that are associated with each other, the table being stored in the storage 13, thus acquiring the characteristic value of the human body that corresponds to the result of the measured impedance. In this case, the main controller 10 can control the display controller 17 so that the characteristic value of the human body is displayed on the display 4.

The temperature controller 15 can change the light emitting state of the light emitting part 9 depending on the result of the measured impedance (electrical characteristics). For example, when the impedance is smaller than or equal to the threshold, the temperature controller 15 can turn on red light of the light emitting part 9. When the impedance is larger than the threshold, the temperature controller 15 can turn on green light of the light emitting part 9. In addition, the temperature controller 15 controls the display controller 17 thus controlling the display 4 so as to perform a display corresponding to the result of the measured impedance (the electrical characteristics). For example, the temperature controller 15 can control the display 4 so that the measured value of the impedance is displayed, a character such as "Skin" or a red mark is displayed when the impedance is low, or a character such as "Clothing" or a green mark is displayed when the impedance is high.

Figure 6:
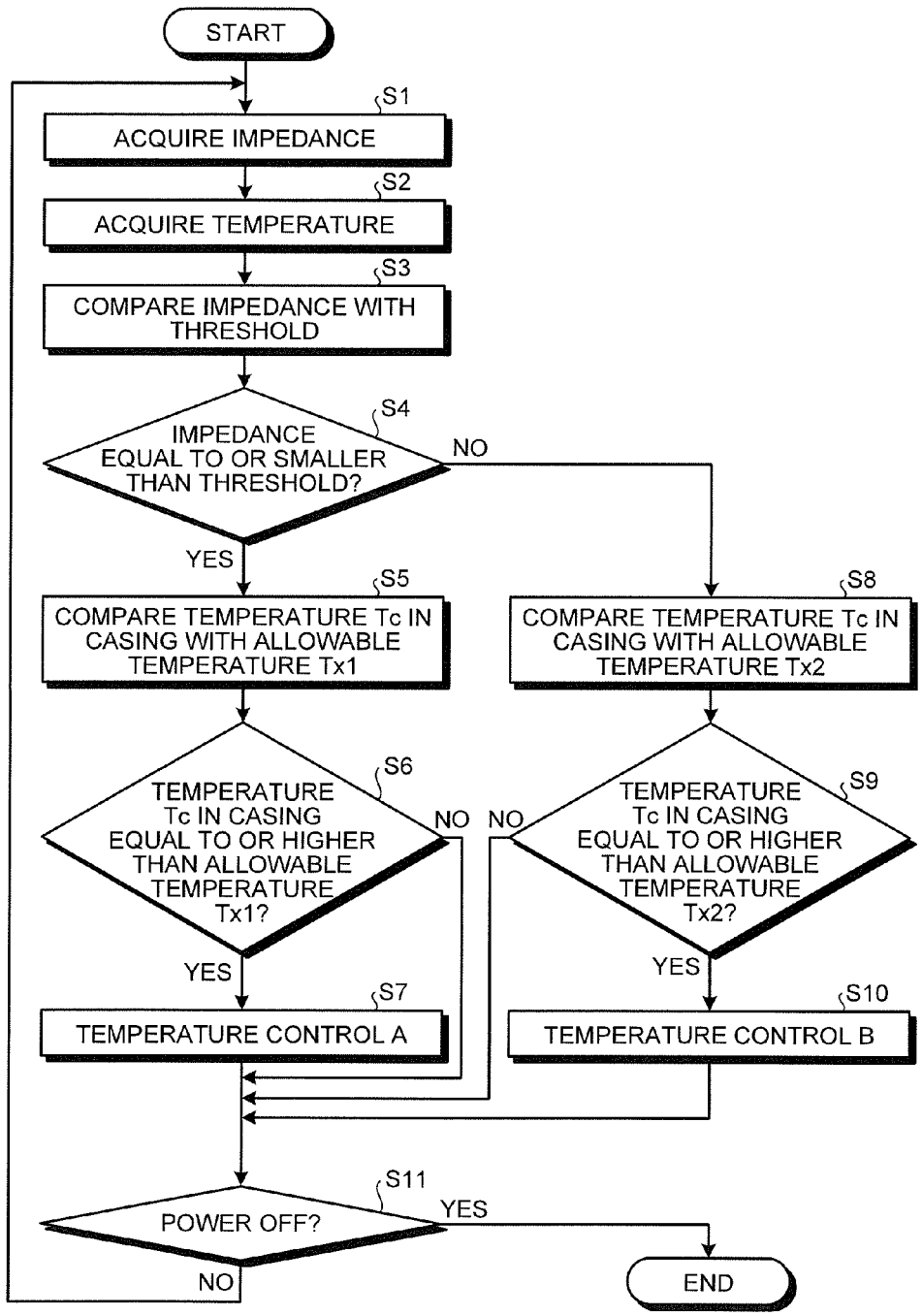
FIG. 6 is an exemplary flowchart illustrating one example of temperature control in the electronic device in the embodiment.

In the present embodiment, as one example, in the electronic device 1, the temperature control of electric components in the casing 2 is performed in procedures illustrated in FIG. 6. First of all, the impedance measurement module 14 (the electrical characteristic measurement module) acquires impedance (electrical characteristics) between two electrodes 6 (S1). Next, the temperature controller 15 acquires the results of detected temperatures by the sensors 7 and 8 (S2). Next, the temperature controller 15 compares the impedance acquired with a threshold (S3). When the impedance is smaller than or equal to the threshold (Yes at S4), the temperature controller 15 compares a temperature Tc in the inside of the casing 2 that is measured by the sensor 8 with an allowable temperature Tx1 (an upper limit temperature) (S5). The allowable temperature Tx1 at S5 has, for example, a value obtained by adding the predetermined allowable temperature range ΔT1 (3° C., for example) to a temperature Te of the electrodes 6 that is measured by the sensors 7. That is, in the present embodiment, as one example, the higher the temperatures of the electrodes 6 are, the higher the allowable temperature Tx1 becomes. In comparison with the temperatures at S5, when the temperature Tc is equal to or higher than the allowable temperature Tx1 (Yes at S6), the temperature controller 15 performs the control of suppressing the heat generation (lowering the temperature) of the electric components (a temperature control A, S7). To be more specific, at S7, as described above, the temperature controller 15 transmits, for example, an instruction to the clock controller 16 or the display controller 17. In response to this instruction, the clock controller 16 reduces the clock speed of the CPU, and the display controller 17 lowers the brightness in the display 4 or reduces a time until the display screen 4a left unoperated becomes dark. Furthermore, when the determination at S4 is No; that is, when the impedance is equal to or larger than the threshold, the temperature controller 15 performs the temperature control of moderately suppressing the heat generation of the electric components compared with the temperature control A. To be more specific, at S8, the temperature controller 15 compares the temperature Tc in the inside of the casing 2 that is measured by the sensor 8 with an allowable temperature Tx2 (an upper limit temperature) (S8). The allowable temperature Tx2 at S8 has, for example, a value obtained by adding the predetermined allowable temperature range ΔT2 (larger than ΔT1, 6° C., for example) to the temperature Te of the electrodes 6 that is measured by the sensors 7. That is, in the present embodiment, as one example, the higher the temperature Te of the electrodes 6 is, the higher the allowable temperature Tx2 becomes. In comparison with the temperatures at S8, when the temperature Tc is equal to or higher than the allowable temperature Tx2 (Yes at S9), the temperature controller 15 performs the control of suppressing the heat generation (lowering the temperature) of the electric components (a temperature control B, S10). When the power supply of the electronic device 1 is not OFF or not set to OFF (No at S11), the processing returns to S1. On the other hand, when the power supply of the electronic device 1 is OFF or set to OFF (Yes at S11), the temperature controller 15 stops a series of temperature controls. Here, in comparison with the temperatures at S5, when the temperature Tc is equal to or lower than the allowable temperature Tx1 (No at S6) and, in comparison with the temperatures at S8, when the temperature Tc is equal to or higher than the allowable temperature Tx2 (No at S9), the processing proceeds to S11. In the present embodiment, as one example, while the power supply of the electronic device 1 is ON, the above mentioned processing from S1 to S11 is repeated.

As explained heretofore, in the present embodiment, as one example, the temperature controller 15 (the controller) controls, in S6 and S7 in the case where the impedance is lower than the threshold (the temperature control A), an electric component so that the amount of the heat generated by the electric component becomes small (the temperature of the electric component becomes low) compared with S9 and S10 in the case where the impedance is higher than the threshold (the temperature control B). Therefore, in the present embodiment, as one example, when the electronic device 1 is brought into direct contact with the arm 100 (the human body), the temperature rise of the electronic device 1 is suppressed compared with the case that the electronic device 1 is brought into contact with the arm 100 with the clothing 200 (the covering) interposed therebetween. Accordingly, as one example, a user is easily prevented from feeling uncomfortable. As one example, when the temperature rise of the electronic device 1 is suppressed to the extent that a user may not easily feel uncomfortable, the electrical operation of the electronic device 1 is not suppressed thus using the electronic device 1 in a higher-performance state.

In the present embodiment, as one example, the temperature controller 15 sets the allowable temperature of the electric component higher along with an increase in the temperature detected by the sensors 7 (the temperature detectors). Therefore, according to the present embodiment, as one example, when difference between the temperature of the electronic device 1 and the temperature of the human body is not so large and a user may not easily feel uncomfortable, the electrical operation of the electronic device 1 is not suppressed thus using the electronic device 1 in a higher-performance state.

In the present embodiment, as one example, the electrodes 6 have been arranged along the width direction of the belt-shaped part 31 (the direction in which the arm 100 extends when wearing the electronic device 1). Therefore, according to the present embodiment, as one example, the electrodes 6 are surely brought into contact with the arm 100 or the clothing 200 compared with the case that the electrodes 6 are arranged along the circumferential direction of the arm 100.

First Modification

Figure 7:
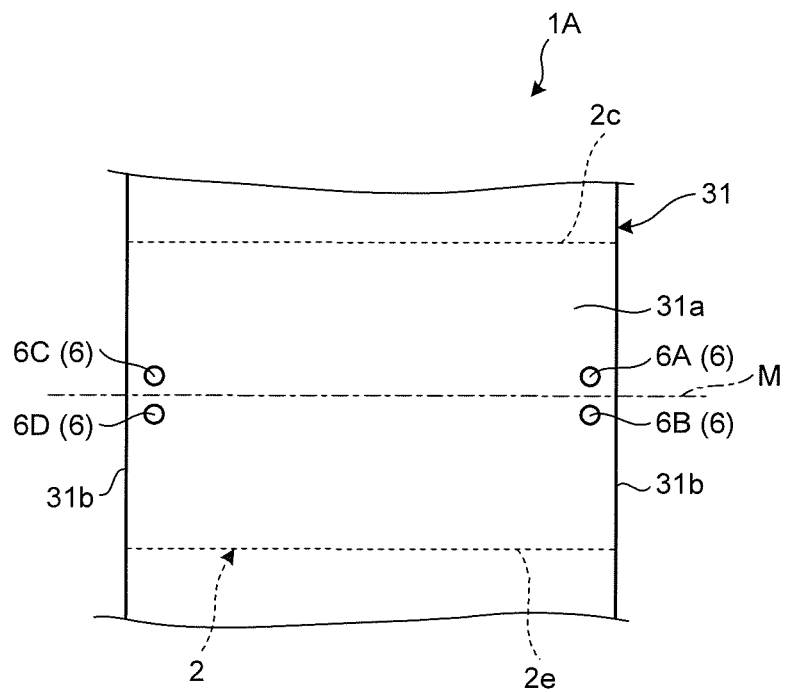
FIG. 7 is an exemplary plan view of one example of an electronic device according to a first modification as viewed from the contact surface side of the electronic device that is brought into contact with an arm of a human body.

In the present modification illustrated in FIG. 7 also, an electronic device 1A has a constitution similar to that of the electronic device 1 according to the above-mentioned embodiment. Therefore, the electronic device 1A can provide similar results to the case of the electronic device 1 in the above-mentioned embodiment because of its constitution similar to that of the electronic device 1. In the present modification, as one example, the electronic device 1A is provided with three or more (four, as one example in the present modification) electrodes 6 (6A to 6D). To be more specific, two electrodes 6A and 6B are aligned, in an area on the back side of the casing 2 of the belt-shaped part 31, along one end portion in the width direction of the belt-shaped part 31 in a mutually spaced-apart manner. These two electrodes 6A and 6B are aligned along the longitudinal direction of the belt-shaped part 31 thus aligning, as one example, in the circumferential direction of the arm 100. Furthermore, two electrodes 6C and 6D are aligned, in an area on the back side of the casing 2 of the belt-shaped part 31, along the other end portion in the width direction of the belt-shaped part 31 in a mutually spaced-apart manner. These two electrodes 6C and 6D are also aligned along the longitudinal direction of the belt-shaped part 31 thus aligning, as one example, in the circumferential direction of the arm 100.

Furthermore, the two electrodes 6A and 6C are aligned along the width direction of the belt-shaped part 31 in a mutually spaced-apart manner. Furthermore, the two electrodes 6B and 6D are also aligned along the width direction of the belt-shaped part 31 in a mutually spaced-apart manner. In addition, the electrodes 6A and 6C are not located at positions close to the end portion 2c of the casing 2 but located at positions close to a center line M extending along the width direction between end portions 2c and 2e, and the electrodes 6B and 6D are also not located at positions close to the end portion 2e of the casing 2 but located at positions close to the center line M. Therefore, according to the present modification, as one example, the electrodes 6A to 6D are easily prevented from being separated (spaced) from the arm 100

(the human body) or the clothing 200 (the covering) compared with the case that the electrodes 6A to 6D are located at a position close to the end portion 2c or 2e.

When the electronic device 1 is provided with three or more electrodes 6, there exist at least three combinations of two electrodes 6. In the present modification, the impedance measurement module 14 can switch the combinations of two electrodes 6 to be energized (used for measurements) to measure the impedance (the electrical characteristics) with respect to each of different combinations of the electrodes 6. The temperature controller 15 controls, when impedance with respect to at least one combination (between two electrodes 6) out of a plurality of combinations of two electrodes 6 is lower than a threshold, an electric component so that the amount of the heat generated by the electric component becomes smaller (the temperature of the electric component becomes lower). That is, according to the present modification, as one example, when the electronic device 1A is partially brought into contact with the arm 100 (the human body) without the clothing 200 (the covering) interposed therebetween, the temperature rise of the electronic device 1A is easily suppressed more reliably.

In the present modification, in view of a state that the electronic device 1A is worn on the arm 100 (the forearm), one of a pair of electrodes 6A, 6B and a pair of electrodes 6C, 6D are located at an end portion on the wrist side of the belt-shaped part 31. Therefore, when the cuff of the clothing 200 is located at a middle portion in the width direction of the belt-shaped part 31 and the electronic device 1A is partially brought into contact with the arm 100 (the human body) on the outside of the cuff (the wrist side) without the clothing 200 (the covering) interposed therebetween, one of the pair of electrodes 6A, 6B and the pair of electrodes 6C, 6D (the combination of electrodes located on the wrist side of the cuff) can be brought into contact with the surface 100a of the arm 100 on the outside of the cuff. Therefore, in this case, the impedance measured between the pair of electrodes located on the wrist side of the cuff is lower than the threshold and hence, the temperature controller 15 controls the electric component so that the amount of the heat generated by the electric component becomes smaller (the temperature of the electric component becomes lower). That is, according to the present modification, as one example, when the electronic device 1A is brought into contact with the arm 100 on the outside of the cuff of the clothing 200, the temperature rise of the electronic device 1A is suppressed more reliably.

Second and Third Modifications

Figure 8:
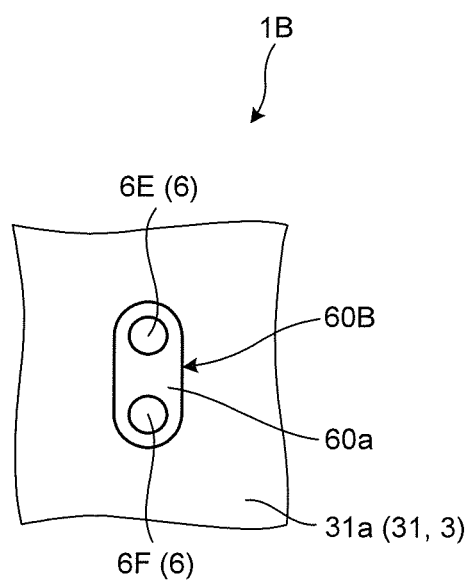
FIG. 8 is an exemplary plan view of an electrode unit in one example of an electronic device according to a second modification.
Figure 9:
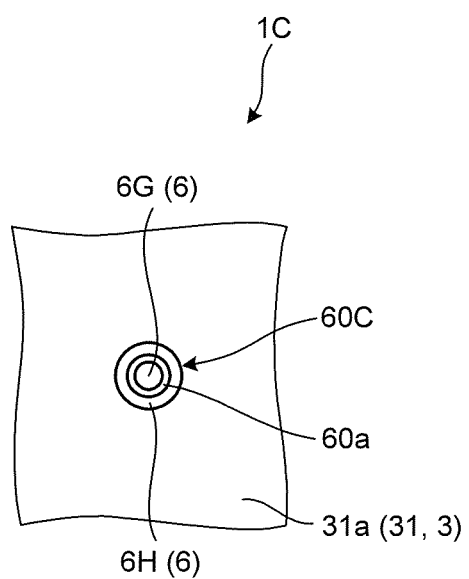
FIG. 9 is an exemplary plan view of an electrode unit in one example of an electronic device according to a third modification.

Each of an electronic device 1B according to the second modification illustrated in FIG. 8 and an electronic device 1C according to the third modification illustrated in FIG. 9 has a constitution similar to that of the electronic device 1 or 1A according to the above-mentioned embodiment or the first modification except that the electronic devices 1B and 10 are provided with electrode units 60B and 60C respectively. Therefore, the electronic devices 1B and 1C in the second and third modifications can provide similar results to the case of the electronic device 1 or 1A in the above-mentioned embodiment or the first modification because of their constitutions similar to that of the electronic device 1 or 1A. Here, in the second modification illustrated in FIG. 8, the electronic device 1B is provided with the electrode unit 60B in which a plurality of electrodes 6 (6E and 6F) are integrated with an insulating member 60a (an insulator) interposed therebetween. Due to such a constitution, as one example, both of the two electrodes 6E and 6F are easily brought into contact with the arm 100 or the clothing 200. Therefore, in the present modification, as one example, the measurement of the impedance (the electrical characteristics) using the two electrodes 6E and 6F can be performed with high accuracy. Furthermore, as one example, the two electrodes 6E and 6F are easily arranged close to each other in a compact manner and hence, as one example, the flexibility of the layout of parts in the inside of the casing 2 of the electronic device 1B can be easily increased. Here, the electrode unit 60B in the second modification can be used as the electrodes 6A and 6B or the electrodes 6C and 6D in the first modification. Furthermore, the electrode unit 60C constituted by integrating the electrodes 6 (6G and 6H) provided to the casing 2 of the electronic device 10 according to the third modification illustrated in FIG. 9 can also provide similar results (advantageous effects) to the case of the second modification. In the third modification, the electrode 6G is constituted in a columnar shape, the insulating member 60a is constituted in a cylindrical shape so as to surround the electrode 6G, and the electrode 6H is constituted in a cylindrical shape so as to surround the insulating member 60a.

For example, characteristics other than the impedance may be used as the electrical characteristics. Furthermore, the number of electrodes may be four or more.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An electronic device comprising:
   a casing comprising a display thereto, the casing being configured to house therein an electric component configured to generate heat;
   a wearing member configured to be wrapped around an arm of a human body to cause the casing to be worn on the arm;
   a plurality of electrodes configured to face, in a state that the casing is worn on an arm, a side of the arm;
   an impedance measurement module configured to measure impedance between two of the electrodes; and
   a controller configured to control the electric component so that when the impedance obtained in the impedance measurement module is lower than a threshold, an amount of the heat generated by the electric component becomes small compared with a case that the impedance is higher than the threshold.
2. The electronic device of claim 1, further comprising:
   a temperature detector configured to detect a temperature of the electrode, wherein
   the controller is configured to increase an allowable temperature of the electric component or in an inside of the casing along with an increase in the temperature detected by the temperature detector.

3. The electronic device of claim 1, wherein
the electrodes comprises three or more electrodes, and
the controller controls, when the impedance between at least any one combination out of a plurality of combinations of two of the electrodes is lower than the threshold, the electric component so that the amount of the heat generated by the electric component becomes small.

4. The electronic device of claim 1, wherein
the wearing member comprises a belt-shaped part wrapped around an arm, and
the electrodes are arranged along a width direction of the belt-shaped part.

5. The electronic device of claim 1, wherein
the wearing member comprises a belt-shaped part wrapped around an arm, and
the electrodes are arranged along a longitudinal direction of the belt-shaped part.

6. The electronic device of claim 4, wherein
the wearing member comprises a belt-shaped part wrapped around an arm, and
a plurality of rows of the electrodes arranged along a longitudinal direction of the belt-shaped part are arranged in the width direction of the belt-shaped part in a spaced-apart manner.

7. The electronic device of claim 1, further comprising:
an electrode unit configured to integrate the electrodes with an insulator interposed therebetween.

8. The electronic device of claim 1, further comprising:
a display part configured to perform a display corresponding to at least one of a case that the impedance obtained in the impedance measurement module is lower than a threshold and a case that the impedance obtained in the impedance measurement module is higher than the threshold.

9. An electronic device comprising:
a casing comprising a display thereto;
a wearing member configured to be wrapped around an arm of a human body to cause the casing to be worn on the arm;
a plurality of electrodes configured to face, in a state that the casing is worn on an arm, a side of the arm; and
a controller configured to control the display so that when the wearing member is wrapped around the arm without clothing interposed therebetween, a heat generation of the display is suppressed based on electrical characteristics of electric signals between the electrodes compared with a case that the wearing member is wrapped around the arm with clothing interposed therebetween.

10. An electronic device comprising:
a casing comprising an electric component thereto;
a wearing member configured to cause the casing to be worn on an arm of a human body;
a plurality of electrodes configured to face, in a state that the casing is worn on the human body, a side of the arm; and
a controller configured to control the electric component so that when the wearing member is worn on the human body without a covering interposed therebetween, a heat generation of the electric component is suppressed based on electrical characteristics of electric signals between the electrodes compared with a case that the wearing member is worn on the human body with a covering interposed therebetween.

* * * * *